United States Patent Office 3,738,960
Patented June 12, 1973

3,738,960
POLYSULFONE POLYMERS FROM ADAMANTANE BISPHENOLS
Robert M. Thompson, Wilmington, Del., and Irl N. Duling, West Chester, Pa., assignors to Sun Research and Development Co., Philadelphia, Pa.
No Drawing. Filed Dec. 30, 1971, Ser. No. 214,429
Int. Cl. C08g 23/00, 51/46
U.S. Cl. 260—49    7 Claims

ABSTRACT OF THE DISCLOSURE

Novel solid polysulfones having the structure:

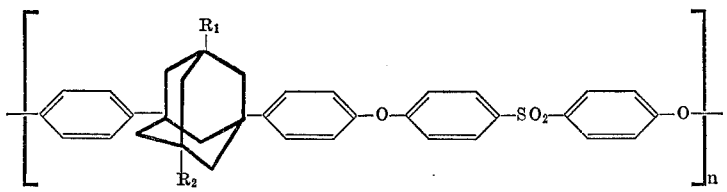

where $R_1$ and $R_2$ are hydrogen or hydrocarbyl radicals having 1 to 20 carbon atoms and $n$ represents the number of such repeating units which are produced. These thermoplastic resins have exceptional oxidation stability, chemical inertness and high heat distortion temperatures and are useful in the manufacture of molded and extruded products.

BACKGROUND OF THE INVENTION

(1) Field of the invention

The present invention relates to polysulfones wherein the repeating unit contains an adamantane moiety.

(2) Descritpion of the prior art

There is a constant effort in the polymer field to provide outstanding new engineering thermoplastics having an unusual combination of properties and the ability to retain these properties under mechanical stress and over a broad temperature range. It is also desired that these thermoplastics have excellent resistance to attack by corrosive chemicals. In addition to the above requirements, the thermoplastics should exhibit processibility and fabricability that allow for high volume manufacturing. It has now been found, in accordance with the present invention, novel thermoplastic polymers which possess the aforementioned properties and in addition have exceptional oxidation stability and high heat distortion temperatures.

SUMMARY

The present invention is directed to and provides new polymers having the structure:

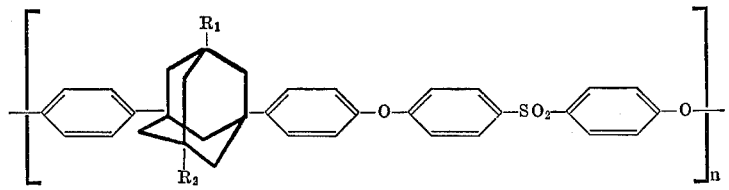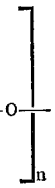

where $R_1$ and $R_2$ are hydrogen or hydrocarbyl radicals having 1 to 20 carbon atoms and $n$ represents the number of repeating units. The hydrocarbyl radicals can be selected from the group consisting of alkyl, cycloalkyl, aryl, alkaryl and aralkyl. These thermoplastic polymers have excellent oxidation stability and high heat distortion temperatures. They are useful in producing molded articles like gears, bearings, pulleys, housing etc. and extruded articles like rods, tubes, pipes, etc.

DESCRIPTION OF THE PREFERRED EMBODIMENTS

The polysulfones of this invention can be prepared from adamantane bisphenols of the structure:

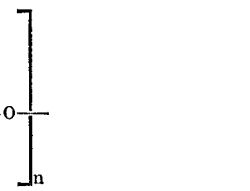
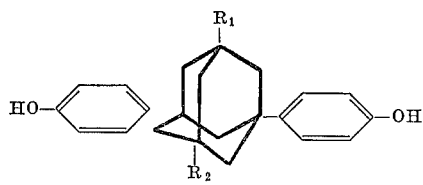

where $R_1$ and $R_2$ have the significance previously given and a dihalosulfone. A preferred procedure comprises preparing the disodium salt of the adamantane bisphenol in situ by the reaction of bisphenol with aqueous sodium hydroxide. All but traces of water must be removed from the reaction mixture before polymerization. Otherwise, hydrolysis of the dihydric phenol salt occurs, resulting in the formation of sodium hydroxide which reacts very rapidly with the newly formed polymer forming the monosodium salt of the sulfone. The polymerization should be conducted in the absence of air.

To the dry disodium salt is slowly added a soltuion of the dihalosulfone in a dry solvent. Excess solvent is allowed to distill at a rate sufficient to hold the reaction temperature at about 120° to 170° C. The polymerization is very rapid at these temperatures and high molecular weights may be attained within an hour's time. Chain growth is regulated by the addition of terminators. A variety of monohydric phenolic salts of monohalogen compounds like methylchloride have been found to be effective. Upon the termination of polymerization, the polymer solution is diluted with dry solvent and filtered. The polymer is then precipitated with alcohol and recovered by filtering and drying.

Generally, a stochiometric ratio of adamantane bisphenol to dihalosulfone is employed although it is sometimes desirable to use an excess of dihalosulfone. Reaction conditions of temperature and pressure may vary over a wide range. For example, operable temperatures range between 85° and 190° C. and preferably between 90° and 170° C. Similarly, the pressure may range from subatmospheric to superatmospheric but preferably from 15 to 200 p.s.i.

The polymers of the present invention preferably have molecular weights in the range of 20,000 to 60,000; this corresponds to $n=35$ to 90. The inherent viscosity is indicative of the degree of polymerization and is used herein as a measure thereof. Inherent viscosity is represented by the equation:

$$\eta_{(inherent)} = \ln \frac{\eta_{(relative)}}{C}$$

where $\eta_{(relative)} = t/t_0$
$t_0$ = flow time through a viscometer of a liquid reference
$t$ = flow time through the same viscometer of a dilute solution of a polymer in the reference liquid
$C$ = concentration of polymer in solution expressed in grams/deciliter In the example, inherent viscosities ($\eta_{inh.}$) were obtained at a concentration of 0.5 gram per deciliter at 100° F. The molecular weight of polymers having M.W. in excess of 20,000 is determined by membrane osmometry.

The solvent employed was tetrachloroethane. The polymer configuration was determined by nuclear magnetic resonance and X-ray scan.

The polysulfones of the present invention have exceptional oxidation stability and a high heat distortion temperature. The polysulfones of the present invention are thermoplastic and are particularly useful in molding operations to produce articles such as gears, bearings, instrument and pump housings, impellers and in extrusion operations to produce articles such as tubes, pipes and rods. Many types of reinforcing materials, pigments and fillers may be compounded with the polymers of this invention. Glass, asbestos, cotton, nylon fibers and glass or mica flakes are useful depending on the ultimate utility of the polymers. The polysulfones may be obtained in a variety of colors by compounding techniques or by dry blending where organic soluble dyes are used.

The adamantane bisphenols used as starting materials are described in commonly assigned U.S. patent application Ser. No. 802,661, filed Feb. 26, 1969 by Robert E. Moore, now U.S. Pat. No. 3,594,427, issued July 20, 1971, entitled Adamantane Bisphenols and are prepared by reacting a compound of the structure:

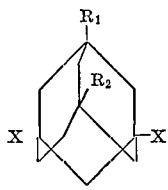

where $R_1$ and $R_2$ are as previously described and X is independently selected from the group consisting of bromo and chloro with an excess of phenol at a temperature in the range of 125° to 200° C. The reaction time for preparing the bisphenols will vary, particularly in regard to the temperature employed, from 4 to 10 hours. In practice, the preferred procedure is to carry out the reaction at reflux which is around 178–185° C. (B.P. phenol 182° C.). At reflux, the reaction requires 5 to 7 hours for good yields. No catalyst is required. The reaction takes place in an excess of phenol which also serves as the solvent for the adamantane reactant and the product. The adamantane bisphenol is most easily recovered by cooling the reaction mixture and pouring it into warm water (66–80° C.) thus precipitating the bisphenol and dissolving the phenol. The crystalline material is filtered and recrystallized, for example, from xylene, toluene or isopropanol-water.

The adamantane hydrocarbons are well known and their preparation is adequately described in the literature.

The dihalo derivatives can be prepared by reacting the corresponding adamantane hydrocarbon with chlorine or bromine in the presence of $AlCl_3$ or $AlBr_3$ as disclosed in Stetter and Wulff, German Pat. No. 101,410 and Stetter in Angew. Chem. International Edit., vol. 1 (1962), No. 6, pages 287–288. The mixed bromo-chloro adamantane can be obtained by reacting a dibromo admantane with a chlorine donor such as carbon tetrachloride in the presence of a Lewis acid catalyst as shown in the copending application of Robert E. Moore, Ser. No. 688,679, filed Dec. 7, 1967, now U.S. Pat. No. 3,676,017, issued Dec. 7, 1971.

Examples of such suitable reactants to prepare the adamantane bisphenols are the bridgehead dichloro, dibromo or bromo-chloro derivatives of the following hydrocarbons: adamantane; 1-methyladamantane; 1-ethyladamantane; 1,3-dimethyladmanantane; 1-methyl-3-ethyladamantane; 1,3-diethyladamantane; 1-n-propyladamantane; 1-isopropyladamantane; 1-n-butyladamantane; 1,3-di-n-pentyladamantane; 1-methyl-3-heptyladamantane; 1-n-decyladamantane; 1-n-decyl-3-ethyladamantane; 1-methyl-3-propyladamantane; 1-isohexyladamantane; 1-methyl-3-cyclohexyladamantane; 1-phenyladamantane; 1-methyl-3-phenyladamantane; 1,3-diphenyladamantane; 1-p-tolyladamantane; 1-benzyladmantane; and the like.

The dihalosulfones useful as starting materials can be prepared by conventional procedures known in the art. For example, 4,4'-dichloro-diphenylsulfone is prepared by reacting p-chlorophenylsulfonyl chloride with chlorobenzene:

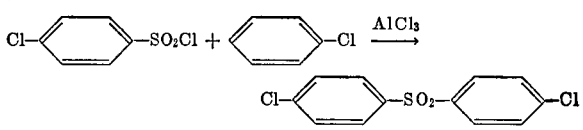

Examples of suitable dihalosulfones are 3,3'-dichlorodiphenyl sulfone, 4,3'-dichlorodiphenyl sulfone, 4,5'-dichlorodiphenyl sulfone and 4,4'-(bis-p-chlorophenylsulfonyl) diphenyl and the like. Other halogenated derivatives of the above compounds may be used but generally bromine and chlorine substituted compounds are the only economically feasible reactants.

The polymerization is preferably carried out in a solvent medium. Most preferably, the solvent should be one in which the reactants are soluble at room temperature. Suitable solvents for the polymerization include sulfolane-(tetrahydroxythiophene-1,1-dioxide), diphenyl sulfone, and dimethylsulfoxide the latter being preferred.

The following example is presented to further illustrate the invention:

EXAMPLE

Preparation of polysulfone from 1,3-bisphenol-5,7-dimethyladamantane

Into a 1 liter resin kettle fitted with a sparge tube, thermocouples, stirrer, dropping funnel and a fractionating column connected to a moisture trap and condenser is charged 78.3 g. (0.225 mole) of 1,3-bisphenol-5,7-dimethyladamantane, 115 g. of dimethylsulfoxide and 330 g. of chlorobenzene. The mixture is heated to 60–80° C. whereupon a clear solution is obtained. The system is flushed with nitrogen and 0.450 mole of 50% aqueous sodium hydroxide is added with good stirring over about 10 min. The system is heated to reflux with a nitrogen sparge. Water and chlorobenzene codistill; the latter is returned to the reactor. When the reaction temperature reached 140° C., the excess chlorobenzene is distilled from the system until the temperature reaches 160° C.

A 50% solution of 64.6 g. (0.225 mole) of 4,4'-dichlorodiphenylsulfone in dry chlorobenzene maintained at 115° C. is added over a 10 minute period. The excess solvent is allowed to distill at a rate sufficient to hold the reaction temperature at 160°. After the addition is complete, the polymerization is continued for one hour.

The polymerization is terminated by passing methylchloride through the polymer mixture at 160° C. Upon cooling, the polymer solution is further diluted with ~600 cc. of chlorobenzene and filtered. The polymer is then precipitated by diluting with 3 liters of ethanol. The resulting white solid is collected and dried in vacuum oven at 135° for several hours. The polymer had an $\eta_{inh.}$ of 1.1 in chloroform.

Pursuant to the requirements of the patent statutes, the principle of this invention has been explained and exemplified in a manner so that it can be readily practiced by those skilled in the art, such exemplification including what is considered to be the best embodiment of the invention. However, it should be clearly understood, that within the scope of the appended claims, the invention may be practiced by those skilled in the art and having the benefit of this disclosure otherwise than is specifically described and exemplified herein.

The invention claimed is:

1. A thermoplastic resin having the structural formula consisting essentially of

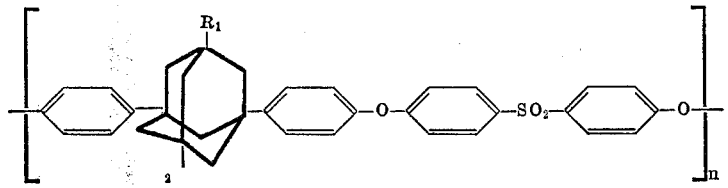

where $R_1$ and $R_2$ are hydrogen or hydrocarbyl radical having 1-20 carbon atoms and $n$ is the number of repeating units.

2. The polymer according to claim 1 wherein $R_1$ and $R_2$ are hydrocarbyl.

3. The polymer according to claim 3 wherein the hydrocarbyl radical has 1-10 carbon atoms.

4. The polymer according to claim 2 wherein the hydrocarbyl radical is selected from the group consisting of alkyl, cycloalkyl, aryl, alkaryl and aralkyl.

5. The polymer according to claim 4 wherein $R_1$ and $R_2$ are selected from the group consisting of methyl and ethyl.

6. The polymer according to claim 5 wherein $R_1$ and $R_2$ are methyl.

7. The polymer according to claim 1 wherein $n$, the number of repeating units is at least 35, as determined from the inherent viscosity of the polymer measured at a concentration of 0.5 gram/deciliter of tetrachloroethane at 100° F.

References Cited
UNITED STATES PATENTS

| | | | |
|---|---|---|---|
| 3,332,909 | 7/1967 | Farnham et al. | 260—47 |
| 3,446,654 | 5/1969 | Barth et al. | 117—123 |

WILLIAM H. SHORT, Primary Examiner

L. L. LEE, Assistant Examiner

U.S. Cl. X.R.

260—33.8 R, 37 R, 37 NP